United States Patent [19]
Iwai et al.

[11] Patent Number: 5,193,017
[45] Date of Patent: Mar. 9, 1993

[54] REFLECTIVE-TYPE ACTIVE MATRIX LIQUID CRYSTAL DISPLAY DEVICE

[75] Inventors: Hiroshi Iwai, Hirakata; Yoneharu Takubo, Toyonaka; Sadayoshi Hotta, Hirakata, all of Japan

[73] Assignee: Matsushita Electric Industrial Co., Ltd., Osaka, Japan

[21] Appl. No.: 638,536

[22] Filed: Jan. 8, 1991

[30] Foreign Application Priority Data

Jan. 11, 1990 [JP] Japan ................. 2-4163

[51] Int. Cl.⁵ ............................ G02F 1/133
[52] U.S. Cl. .................... 359/59; 359/67; 359/70; 359/87; 257/59
[58] Field of Search .............. 359/58, 59, 70, 69, 359/67, 54; 340/784; 357/23.7, 45, 4, 23.6, 15

[56] References Cited

U.S. PATENT DOCUMENTS

| | | | |
|---|---|---|---|
| 4,103,297 | 7/1978 | McGreivy et al. | 359/59 |
| 4,386,352 | 5/1983 | Nonomura et al. | 359/59 |
| 4,648,691 | 3/1987 | Oguchi et al. | 359/59 |
| 4,704,002 | 11/1987 | Kikuchi et al. | 359/59 |
| 4,714,636 | 12/1987 | Yokono et al. | 359/75 |
| 4,776,673 | 10/1988 | Aoki et al. | 359/59 |
| 5,051,800 | 9/1991 | Shoji et al. | 359/59 |

FOREIGN PATENT DOCUMENTS

| | | | |
|---|---|---|---|
| 0338766 | 10/1989 | European Pat. Off. | |
| 0213821 | 8/1990 | Japan | 359/59 |
| 0230129 | 9/1990 | Japan | 359/59 |
| 0234125 | 9/1990 | Japan | 359/59 |

OTHER PUBLICATIONS

High Density Reflective Type TFT Array for High Definition Liquid Crystal Projection TV System, Y. Takubo et al., Japan Display '89, pp. 584-587.

Primary Examiner—William L. Sikes
Assistant Examiner—Tai V. Duong
Attorney, Agent, or Firm—Wenderoth, Lind & Ponack

[57] ABSTRACT

An active matrix liquid crystal display device employing a thin film transistor (TFT) system includes a semiconductor of each TFT which is smaller in width than a gate bus electrode and is arranged on the gate bus electrode, and a drain electrode of the TFT is formed as a reflective pixel electrode thereby providing a light diffusion effect.

5 Claims, 4 Drawing Sheets

REFLECTIVE-TYPE ACTIVE MATRIX LIQUID CRYSTAL DISPLAY DEVICE

BACKGROUND OF THE INVENTION

1. Field of the Invention

The present invention relates to a liquid crystal display system and more particularly, a liquid crystal display device having a matrix array of switching transistors connected to reflective electrodes, which are addressable row by row.

2. Description of the Prior Art

A reflective-type liquid crystal display device has been known which comprises a matrix array substrate, a transparent insulating substrate provided with a transparent common electrode, and a liquid crystal layer sandwiched between the two substrates. The matrix array substrate is arranged such that a plurality of field effect transistors (FET) or thin film transistors (TFT) are formed as switching elements on a semiconductor or insulator substrate. An output terminal of each transistor is coupled to a reflective pixel electrode across an insulating layer of silicon oxide, silicon nitride, or the like. For example, some of such conventional devices are disclosed in U.S. Pat. 4,103,297 and in a report "High density reflective type TFT array for high definition liquid crystal projection TV system" by Y. Takubo et al., in SID 1989 Japan Display, pp. 584-587.

The operation of the reflective-type liquid crystal display device having the foregoing arrangement will now be described.

When a gate drive signal for selecting pixels is fed to the gate electrode, the transistor becomes activated and thus, an image signal is transmitted from the source electrode of the transistor to the reflective pixel electrode. As the result, a voltage is applied to the liquid crystal between the reflective pixel electrode and the opposite common electrode for image development. At the time, an incident light which comes through the opposite transparent substrate is reflected on the reflective pixel electrode. Also, portions of the light are polarized during transmission across the liquid crystal layer so that a contrast appears between polarizing pixels and not-polarizing pixels to form an image. Black stripes are also provided for defining a boundary between two adjacent pixels and thus, ensuring improvements in the picture quality.

However, the conventional device is fabricated in particular by forming an insulating layer over the switching elements, providing contact holes in the insulating layer and thereafter, forming the reflective pixel electrodes, so that its process becomes complicated with a large number of masks. Accordingly, the cost of production will disadvantageously be increased.

SUMMARY OF THE INVENTION

The present invention is directed, for the purpose of solving the foregoing problems, to an improved reflective-type liquid crystal display device which is fabricated using a minimum number of masks, by a simple process of less steps, and at lower cost and as the result, can almost be equal in the aperture ratio to the conventional reflective-type liquid crystal display device.

To achieve this object, a reflective-type liquid crystal display device according to the present invention is arranged such that: a semiconductor layer of a thin film transistor which is equal to or smaller in width than a gate bus electrode is formed on the gate bus electrode which is provided on an insulating substrate without being formed into a particular shape for development of the transistor; a the drain electrode of the thin film transistor exhibits a high rate of reflectance; and a pixel electrode is formed of a material which is high in both electrical conductivity and light diffusion efficiency.

As the result, the steps of production process can be minimized at least four steps less than that for a conventional device and also, the cost of production will be reduced due to the reduced number of masks. The connection between the drain electrode of the thin film transistor and the pixel electrode is no longer needed, whereby the aperture ratio can be increased. Furthermore, when the reflective pixel electrode is formed of a transparent material, the liquid crystal display device will be used as a transmission type: i.e. the device can be shifted with ease to another type by changing the material.

BRIEF DESCRIPTION OF THE DRAWINGS

The foregoing and other objects and features of the present invention will clearly be understood from the following detailed description referring to the accompanying drawings.

DESCRIPTION OF THE PREFERRED EMBODIMENT

Figure 1:
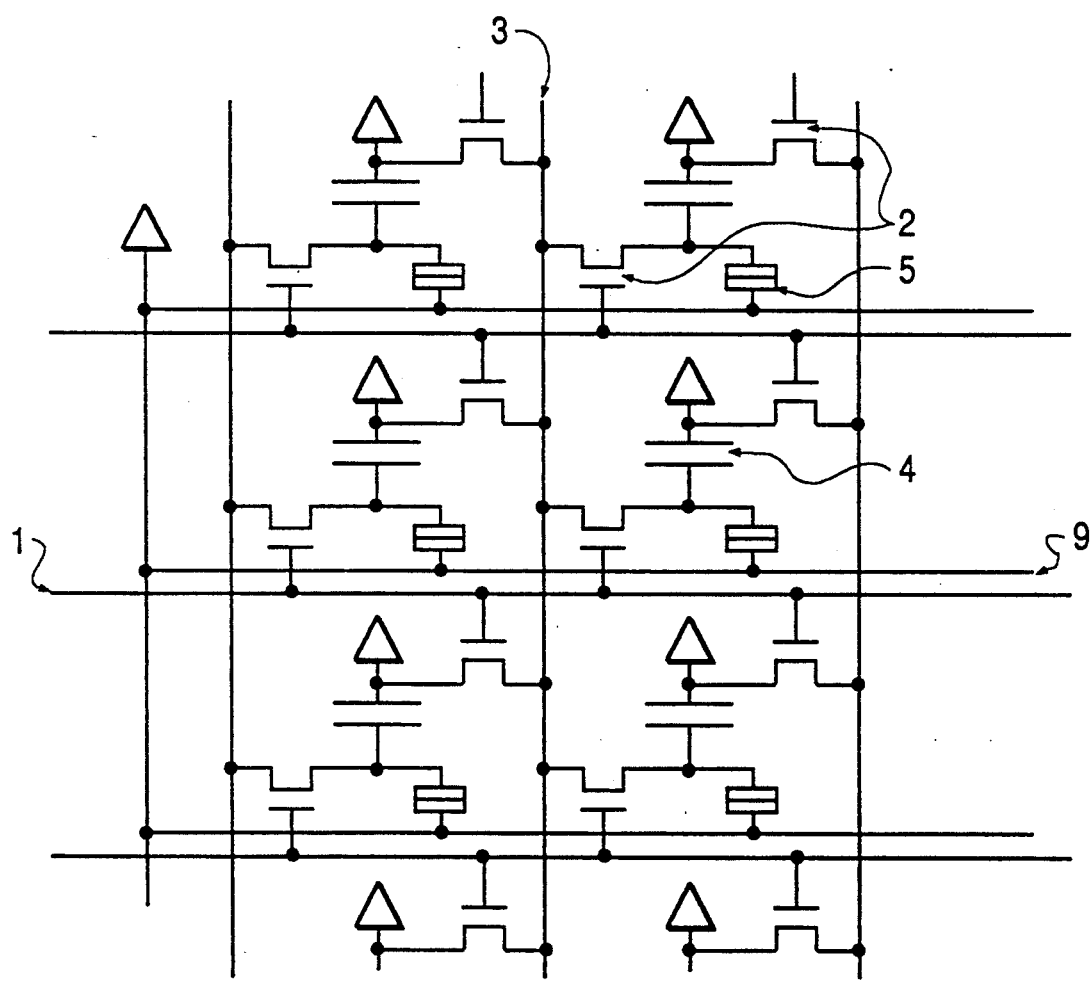
FIG. 1 is a diagram showing an electrical equivalent circuit in a reflective-type liquid crystal display device of a preferred embodiment of the present invention.

FIG. 1 is a diagram showing an equivalent circuit of a reflective-type liquid crystal display device. In operation, when a scanning signal passing a gate bus electrode 1 is fed to a TFT 2a, a data signal runs from a source bus electrode 3 to a TFT 2b thus providing a potential across a liquid crystal 4. An electrode provided on an opposite substrate is connected to every pixel and adapted for common use. Simultaneously, a charge is stored in an auxiliary capacitor 5 formed by a common electrode 9. Each pixel contains two TFTs 2a and 2b. As a scanning signal is fed to the gate bus electrode 1, new data signals are applied to horizontally aligned pixels respectively at a time. When receiving different data signals, the aligned pixels exhibit a difference in the luminance between two adjacent pixels thus producing an image.

Figure 2:
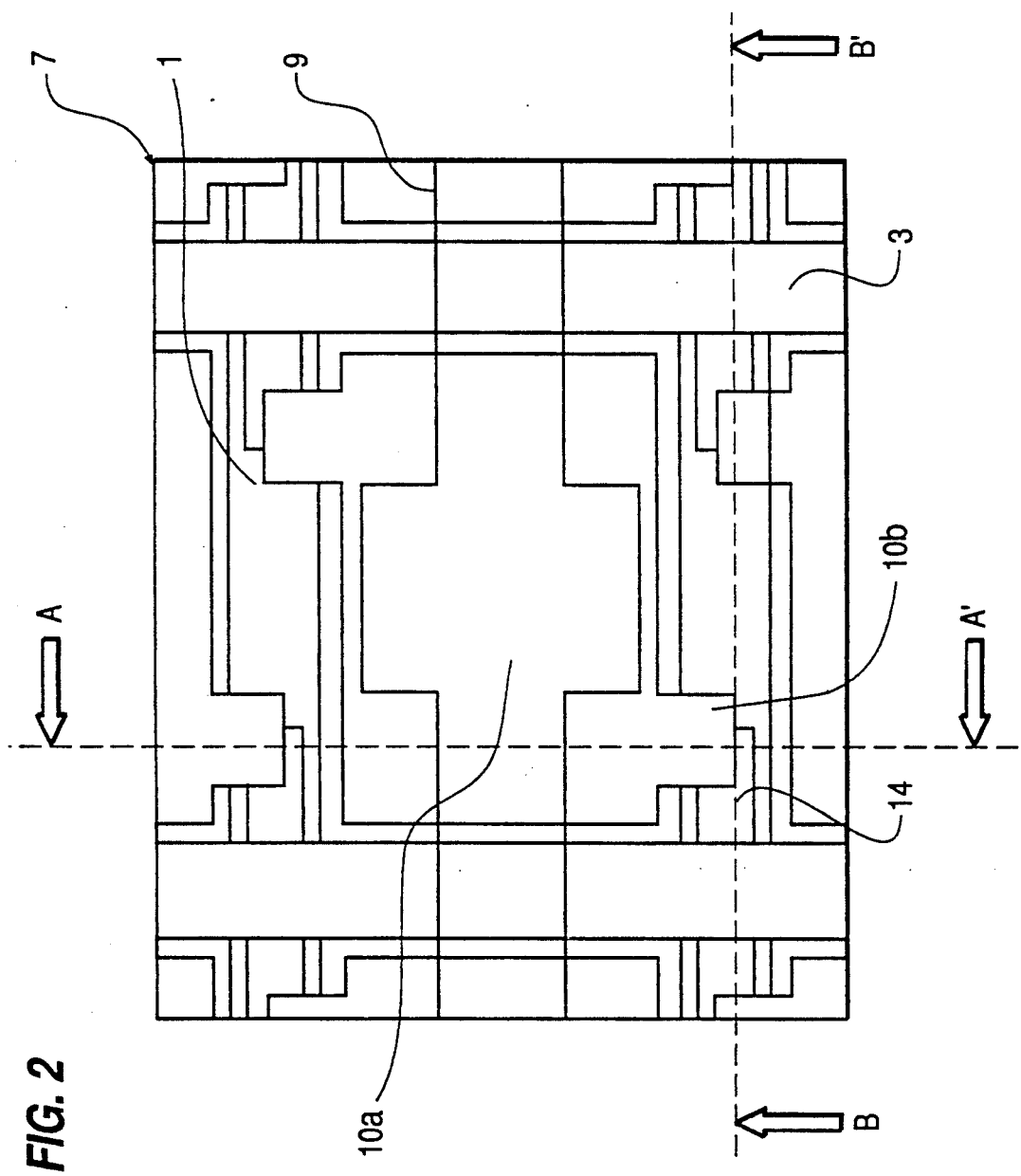
FIG. 2 is a plan view showing a matrix TFT array in the reflective-type liquid crystal display device of the embodiment of the present invention.
Figure 3:
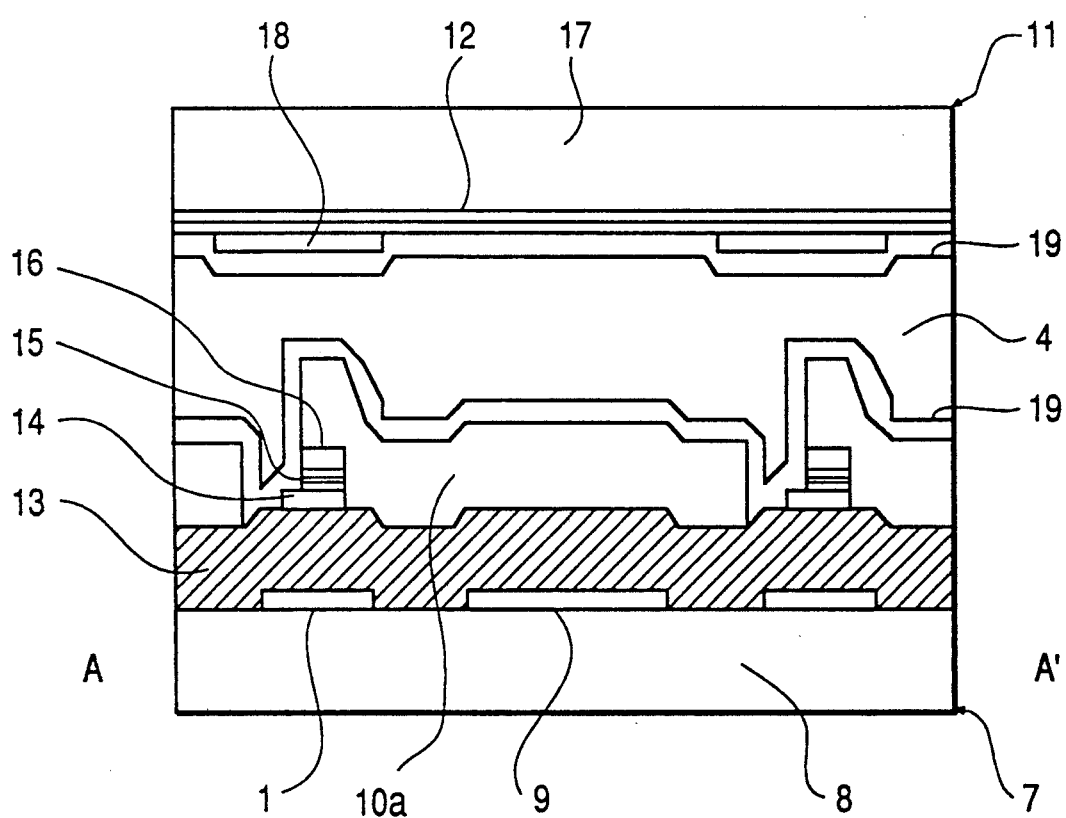
FIG. 3 is a cross sectional view of the reflective-type liquid crystal display device, taken along the line A—A' of FIG. 2.
Figure 4:
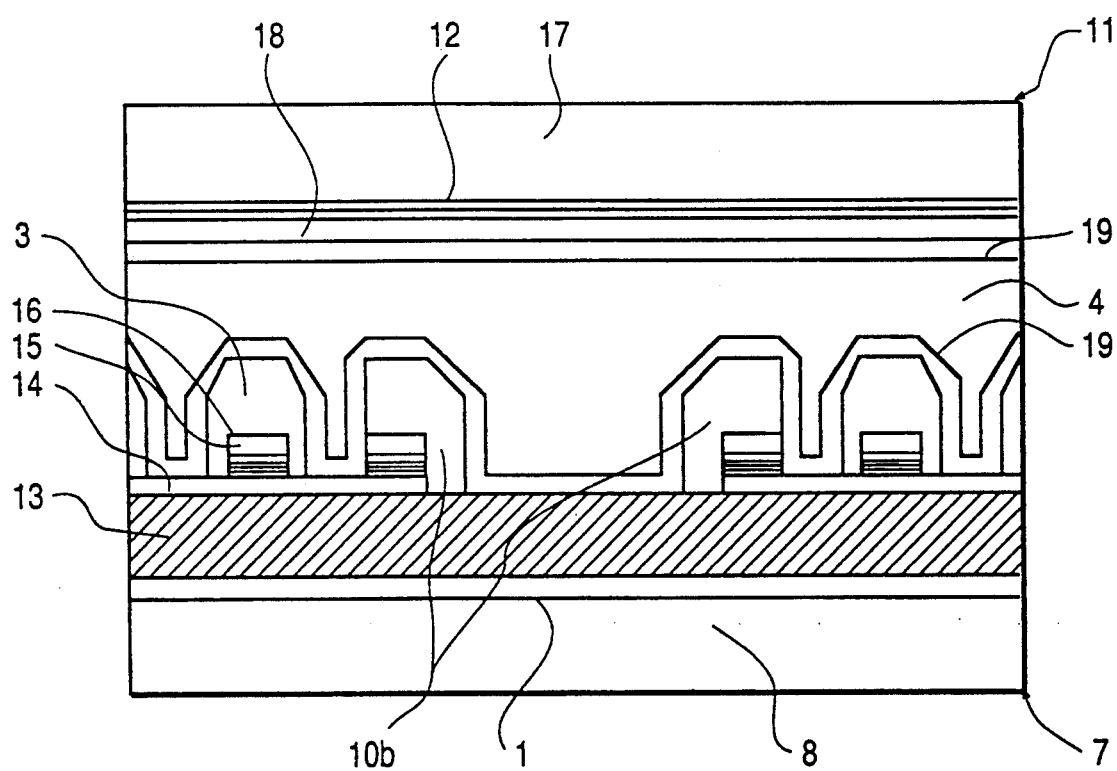
FIG. 4 is a cross sectional view of the reflective-type liquid crystal display device, taken along the line B—B' of FIG. 2.

FIG. 2 illustrates the plan arrangement of a matrix TFT array substrate in a reflective-type liquid crystal display device showing one embodiment of the present invention. FIGS. 3 and 4 are cross sectional views taken along the lines A—A' and the B—B' of FIG. 2 respectively.

The gate bus electrode 1 is formed by a sputtering method in which metallic chrome is deposited to a thickness of about 1000 angstroms on a glass substrate 8 for extending in a particular pattern. At that time, no projection nor extended shape is developed since it serves as the gate electrode of each TFT as shown in FIG. 2. Also, an ITO (indium-tin oxide) electrode 9 is formed, on the same substrate, in parallel to the gate bus electrode 1. The ITO electrode 9 also serves as the opposite electrode to a reflective pixel electrode 10a for providing a capacitor therebetween. As shown in FIG. 1, the ITO electrode 9 is coupled to the other ITO electrodes in the array by a single line outside the illustrated area and also, electrically communicated to a transparent common electrode 12 (of ITO, 1000 angstrom thick) arranged on an opposite glass substrate 11. The capacitor is called an auxiliary capacitor 5 and is provided for compensating for a discharge from the pixel capacitance. The auxiliary capacitor 5 according to the present invention is adapted to have a capacitance of three times the pixel capacitance (about 0.1 pF) of the capacitor 4 using a (4000-angstrom-thick) dielectric film of silicon nitride (about 6 in dielectricity) over the ITO electrode 9. Using a plasma CVD process, a gate insulation layer 13 in TFT is formed of silicon nitride (to a thickness of 4000 angstroms) and subsequently, a semiconductor layer of pure amorphous silicon is deposited (to a thickness of 1000 angstroms). The silicon nitride layer is partially used as a dielectric of the auxiliary capacitor 5. The semiconductor layer 14 is then shaped to an island pattern which extends along the gate bus electrode 1 and is narrow as widthwisely set back at both the side ends-2 micrometers from each side end of the gate bus electrode 1. As shown in FIG. 2, two semiconductor layers are provided for each pixel. This extra arrangement provides an advantage in that no pixel failure appears when a defect in a TFT circuit is caused. Generally, a liquid crystal panel using a TFT system is much desired to ensure a higher performance and it is thus understood that such an extra arrangement is essential for fabricating a high-density, large-capacity liquid crystal panel. A 500-angstrom-thick upper layer of phosphorus-doped amorphous silicon (referred to as an n+ semiconductor layer 15 hereinafter) is then developed over the semiconductor layers 14 by the plasma CVD method. In sequence, a barrier metal layer 16 of titanium is formed to a thickness of 500 angstroms by sputtering. The barrier metal layer 16 is also shaped into a desired pattern for defining the source bus electrode 3 and a portion of the drain electrode 10b of the TFT. The barrier metal layer 16 is strictly to prevent the aluminum material, which forms the source bus electrode 3 and the drain electrode 10b, from diffusing into the semiconductor layers 14. With the barrier metal layer 16 serving as a mask, unwanted portions of the n+ semiconductor layer 15 are removed by etching from the pure semiconductor layer 14. The n+ semiconductor layer 15 provides an ohmic contact between the semiconductor layer 14 and the drain electrode 10b. Then, another layer of aluminum is deposited by the sputtering process and shaped into a specified pattern constituting the source bus electrode 3, the drain electrode 10b, and the reflective pixel electrode 10a at a time. The drain electrode 10b and a portion of the source bus electrode 3 are then formed on the barrier metal layer 16. The reflective pixel electrode 10a and the drain electrode 10b are electrically connected to each other and show no definite difference in operation. In this embodiment, the reflective pixel electrode 10a is designated as a pixel area which will be activated for image development on the liquid crystal. It is then essential that the surface of the aluminum layer is locally roughed so that the reflective pixel electrode 10a serves as a light diffusing reflector substrate. In the present invention, the aluminum layer is formed to a thickness of 8000 angstroms under a condition that the substrate is maintained at about 150° C. and a vacuum pressure of about 2 mTorr is applied during the introduction of argon gas. As the result, crystalline particles of aluminum are developed on the surface which thus becomes rough. Although the source bus electrode 3 and the drain electrode 10b are also roughed on the surface, no drawback is found in the performance of the TFT. Then, the matrix TFT array substrate 7 in a reflective-type liquid crystal display device of the present invention is constructed in the foregoing arrangement.

The opposite substrate 11 consists mainly of a glass substrate 17 on which a 1000-angstrom-thick layer of ITO is provided for serving as the common transparent electrode 12. In addition, black stripes 18 are provided for defining a boundary between two adjacent pixels and protecting the semiconductor layer 14 of each TFT from being exposed to a direct incident light. The black stripes 18 are formed of metallic chrome (to, a thickness of 1000 angstroms) by a combination of sputtering and patterning procedures. The black stripes 18 are arranged in a lattice or matrix form so as to cover both the gate bus electrodes 1 and the source bus electrodes 3 arrayed in combination on the matrix TFT array base substrate 7 when the matrix TFT array substrate 7 and the opposite substrate 11 are overlapped.

Both the matrix TFT array substrate 7 and the opposite substrate 11, between which the liquid crystal 4 is sandwiched, are coated on the liquid crystal side surface, for orientation of the liquid crystal 4, with orientation layers 19 (of polyimid polymer, about 1000 angstroms in thickness) respectively which are finished by a rubbing process.

The reflective-type liquid crystal display device is arranged in this manner and its operation is equal to that of the conventional one.

According to the embodiment of the present invention, the semiconductor of a thin film transistor is provided on the gate bus electrode and arranged smaller in width than the gate bus electrode while the drain electrode consists mainly of a portion of the light diffusing reflective electrode formed by vapor deposition of aluminum at a low vacuum pressure. Thus, the production process will be facilitated as compared to that of the conventional reflective-type liquid crystal display device and also, the cost of production will be appreciably reduced due to requirement of a minimum number of maskings. In addition, the space of thin film transistors needs not be accounted for and thus, the aperture ratio will be increased.

When a light diffusing pixel electrode which serves as the drain electrode in a thin film transistor is formed of ITO, the liquid crystal display device will be used as a transmission type device. In other words, both the reflective and transmission types can be fabricated using the same masking and the cost of production will be minimized.

We claim:

1. An active matrix liquid crystal display device comprising:
   a first substrate having formed thereon an array of thin film transistors formed in a matrix, a plurality of parallel gate buses each having a constant width, a plurality of source buses each having a constant width and perpendicular to the gate buses, and an array of pixel electrodes formed in a matrix and driven by the array of thin film transistors;

a second substrate opposing the first substrate and having formed thereon a transparent common electrode opposing the array of pixel electrodes; and a liquid crystal layer sandwiched between the first and second substrates;

wherein each of the thin film transistors comprises:

a gate bus formed on an insulating substrate and having a constant width and no projection not extended shape;

a gate insulating layer formed on the gate bus;

a semiconductors layer formed on the gate insulating layer in a portion above the gate bus, the semiconductor layer being elongated in a longitudinal direction of the gate bus and having a constant width which is smaller than the width of the gate bus;

a conductive material layer patterned into a first part constituting a source bus having a constant width and no projection nor extended shape and disposed on a part of the semiconductor layer and the gate insulating layer, a second part separated from the first part and constituting a drain electrode disposed an another part of the semiconductor layer, and a third part continuous from the second part and constituting a pixel electrode disposed on the gate insulating layer.

2. An active matrix liquid crystal display device according to claim 1, wherein said conductive material layer is formed on the semiconductor layer via an impurity doped semiconductor layer formed on the semiconductor layer and a barrier metal layer formed on the impurity doped semiconductor layer.

3. An active matrix liquid crystal display device according to claim 1, wherein said first substrate further comprises a common conductive layer formed on the insulating substrate in parallel to the gate bus so as to form an auxiliary capacitance between said common conductive layer and the pixel electrode via the gate insulating layer.

4. An active matrix liquid crystal display device according to claim 1, further comprising black stripes formed on the second substrate for defining a boundary between two adjacent pixels.

5. An active matrix liquid crystal display device according to claim 11, wherein said pixel electrode is a light reflective electrode having a light diffusing surface.

* * * * *